Aug. 2, 1949.    D. G. SOUSSLOFF ET AL    2,477,773
CHUCK
Filed March 20, 1945
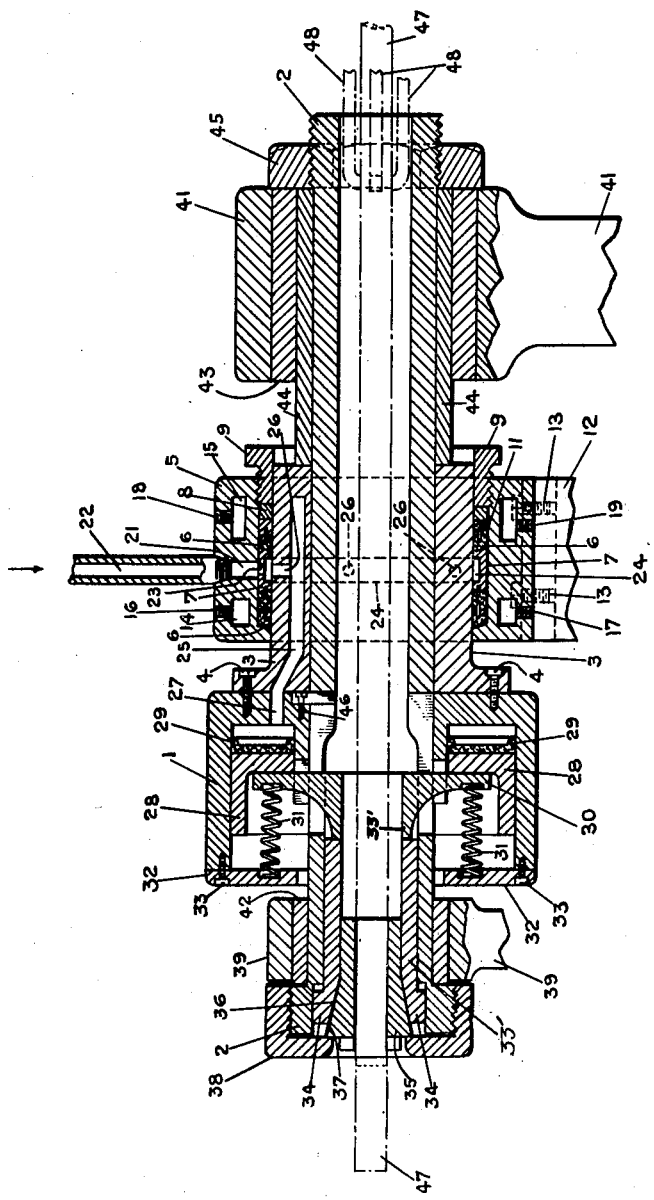
INVENTOR.
D. G. SOUSSLOFF.
H. C. HAAG.
BY
ATTORNEYS.

Patented Aug. 2, 1949

2,477,773

UNITED STATES PATENT OFFICE 2,477,773

CHUCK

Dimitri G. Soussloff, New York, N. Y., and Herbert C. Haag, Hohokus, N. J., assignors to Celanese Corporation of America, a corporation of Delaware Application March 20, 1945, Serial No. 583,732

3 Claims. (Cl. 279—4)

This invention relates to automatic screw machines, lathes, and the like, and relates more particularly to work holders, such as chucks, and the like, for automatic screw machines employing cylindrical spindles through which work, in the form of bars and the like, is adapted to be fed.

An object of this invention is to provide a novel collet operating mechanism for an automatic screw machine.

Another object of this invention is the provision of a novel pneumatically operated collet for an automatic screw machine adapted to hold satisfactorily rods, for example, plastic rods of varying diameter.

Other objects of this invention, together with certain details of construction and combinations of parts, will appear from the following detailed description and drawing.

Extruded plastic rods vary in diameter from .010" to .060" and such variation may be present in one four foot length. In fabricating parts from plastic rods on automatic screw machines, it was not possible heretofore to handle rods having diameters which varied more than .015". Accordingly, it was necessary to sort out the various sizes either at the machine or on the bench. Usually there were rods of critical sizes; some had diameters which were too large for one collet yet too small for the next larger collet. In such instances the rod had to be chucked in the larger collet which frequently permitted the rod to turn when taking heavy cuts. The result was a large percentage of scrap. This difficulty could of course be overcome by centerless grinding the rods to uniform diameter. However, this operation would increase the cost of the product.

We have constructed a pneumatically operated collet which is relatively simple in construction and efficient in operation, being capable of handling rods varying as much as .070" in diameter, thus effecting a saving in labor cost since the sawing of rods into short lengths and sorting the pieces according to diameter dimension is obviated. A saving in material is also effected by reducing scrap previously produced in working with rods of a diameter size which could not be held firmly by the collet employed.

The preferred embodiment of our invention is shown in the accompanying drawing wherein the figure is a horizontal cross-sectional view showing the details of our fluid operated collet.

Referring now to the drawing, our novel device comprises an annular cylinder 1 mounted on a rotatable cylindrical shaft 2 of an automatic screw machine, for example a No. 2 Brown and Sharpe screw machine. An extension sleeve 3 is attached, as by screw bolts 4, to the rear of cylinder 1, or it may be integral therewith. The extension sleeve 3 is surrounded by a gland housing 5 between which and the extension sleeve are inserted packing rings 6, a manifold ring 7 and a bull ring 8, which rings are held in position by a packing nut 9. The packing rings 6 and manifold ring 7 are held together by means of pins 11 to prevent shifting of the rings relative to each other, while at the same time forming a unitary structure. The gland housing 5 is fixed to the frame 12 of the screw machine by means of screw bolts 13.

The gland housing is cored as shown at 14 and 15 for the circulation therethrough of a cooling medium, core 14 being provided with an inlet 16 and an outlet 17 while core 15 is provided with an inlet 18 and an outlet 19 for the cooling medium.

The gland housing is also provided with a threaded passageway 21 in which is screw threaded a conduit 22 connected to a suitable air supply through a three-way valve (not shown). The passageway 21 is connected to an opening 23 in manifold ring 7 which in turn is connected to an annular passageway 24 in said manifold ring 7. The air from conduit 22 is adapted to pass through passageway 21, opening 23 and annular passageway 24 into an air port 25 formed in extension sleeve 3 through a plurality of openings 26 formed circumferentially about the periphery of extension sleeve 3 in alignment with passageway 24 in the manifold ring 7. Air port 25 is connected to an air port 27 formed in the rear wall of cylinder 1 and is adapted to lead air into said cylinder.

Movably mounted in the cylinder 1 is an annular piston 28 provided on its rear face with a packing, such as a suitable leather washer 29. Piston 28 has suitably attached thereto disc 30, the piston and disc being adapted to operate against the tension of springs 31 fixed to said disc and to an annular cylinder closure member or retainer plate 32 attached to cylinder 1 by means of screw bolts 33. Fingers 33' of disc 30 are adapted to engage a sleeve 34 arranged about and cooperating with collet jaws 35. The inner surface of sleeve 34 is tapered at 36 and the outer surfaces of collet jaws 35 are tapered at 37 to match the taper of sleeve 34. The collet jaws 35 are maintained in position by means of a spindle nut 38 screwed onto the end of the shaft 2.

The assembly described above is supported in bearing members 39 and 41 mounted on the framework of the screw machine, said bearings being provided with bronze bearing surfaces 42 and 43 respectively. A sleeve 44 is mounted on shaft 2 and functions as a spacer between extension sleeve 3 and thrust nut 45 screwed onto the rear end of shaft 2. The thrust nut prevents axial movement of the cylinder assembly on shaft 2.

In order to assure that cylinder 1 revolve with shaft 2, said cylinder is keyed to said shaft by means of a bolt 46.

In operation, a rod 47 to be operated upon is inserted through the collet jaws 35, the cylindrical shaft 2 and between the fingers of a reciprocating rod gripping and feeding mechanism of which fingers 48 are diagrammatically shown. The insertion of the rod may be effected while the shaft 2 of the screw machine is rotating or stationary. The air, under suitable pressure, is admitted through conduit 22, passes through passageway 21, opening 23, annular passageway 24, opening 26 and air ports 25 and 27 into cylinder 1. Piston 28 is caused to move forward by the air pressure, moving fingers 33' of disc 30 which in turn push against sleeve 34 thus closing the collet jaws 35 to hold the rod firmly therebetween.

The operation of the piston and the parts movable thereby and of the collet jaws closing is effected through the three-way valve which is controlled by a cam and cam follower arrangement (also not shown) operated by the screw machine.

The "air cylinder" is single acting, the piston being returned, when the air pressure is removed, by springs 31. When the piston returns to its inoperative position, the reciprocating feeding means acts to feed a predetermined length of rod forward.

While the device of the present invention is eminently suitable for use when plastic rods are operated upon, it will be appreciated that it may be employed in connection with rods of any material such as, for example, wood, metal, etc.

It is to be understood that the foregoing detailed description is given merely by way of illustration and that many variations may be made therein without departing from the spirit of our invention.

Having described our invention, what we desire to secure by Letters Patent is:

1. A rotatable fluid actuated chuck having a sleeve mounted on a rotatable element for rotation therewith, a gland housing surrounding said sleeve containing a manifold ring, a cylinder attached to said sleeve having an annular piston therein and a conduit interconnectig said gland manifold ring and cylinder through which fluid under pressure is passed to enter said cylinder and actuate said piston, an annular disc movable by said piston, a plurality of fingers projecting from said disc and through guide openings in said cylinder, and a slidably mounted sleeve in contact with said fingers surrounding a plurality of flexible collet jaws, the movement of said piston, disc, fingers and sleeve acting to contract said collet jaws.

2. A rotatable fluid actuated chuck having a sleeve mounted on a rotatable element for rotation therewith, a gland housing surrounding said sleeve containing a manifold ring, a cylinder attached to said sleeve having an annular piston therein and a conduit interconnecting said gland manifold ring and cylinder through which fluid under pressure is passed to enter said cylinder and actuate said piston, an annular disc movable by said piston, a plurality of fingers projecting from said disc and through guide openings in said cylinder, a slidably mounted sleeve in contact with said fingers having a tapered bore flaring outwardly and surrounding a plurality of tapered flexible collet jaws, the movement of said piston, disc, fingers and tapered sleeve acting to contract said collet jaws.

3. A rotatable fluid actuated chuck having a sleeve mounted on a rotatable element for rotation therewith, a gland housing surrounding said sleeve containing a manifold ring, a cylinder attached to said sleeve having an annular piston therein and a conduit interconnecting said gland manifold ring and cylinder through which fluid under pressure is passed to enter said cylinder and actuate said piston, an annular disc movable by said piston, a plurality of fingers projecting from said disc and through guide openings in said cylinder, a slidably mounted sleeve in contact with said fingers having a tapered bore flaring outwardly and surrounding a plurality of tapered flexible collet jaws, the movement of said piston, disc, fingers and tapered sleeve acting to contract said collet jaws and expansion spring means operative on release of fluid pressure pressing on said disc and an end cylinder wall for returning said disc and piston to inoperative position and permit the collet jaws to expand.

DIMITRI G. SOUSSLOFF.
HERBERT C. HAAG.

REFERENCES CITED

The following references are of record in the file of this patent:

UNITED STATES PATENTS

| Number | Name | Date |
|---|---|---|
| 728,572 | Hanson | May 19, 1903 |
| 1,236,453 | Lavoie | Aug. 14, 1917 |
| 1,925,109 | Olson | Sept. 5, 1933 |
| 1,934,411 | Dahlman | Nov. 7, 1933 |
| 2,270,927 | Browne | Jan. 27, 1942 |
| 2,291,147 | Carlsen | July 28, 1942 |